United States Patent
Madasamy et al.

(10) Patent No.: US 10,494,028 B2
(45) Date of Patent: Dec. 3, 2019

(54) VEHICLE FRAME STRUCTURE

(71) Applicant: Ford Global Technologies, LLC, Dearborn, MI (US)

(72) Inventors: Chelliah Madasamy, Canton, MI (US); Laike Misikir, Ann Arbor, MI (US); Djamal Eddine Midoun, Ann Arbor, MI (US); Jamil M. Alwan, Ann Arbor, MI (US); Thiag Subbian, Farmington Hills, MI (US); Thomas Mueller, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 73 days.

(21) Appl. No.: 15/628,798

(22) Filed: Jun. 21, 2017

(65) Prior Publication Data
US 2018/0370569 A1    Dec. 27, 2018

(51) Int. Cl.
| | |
|---|---|
| *B62D 21/15* | (2006.01) |
| *B62D 25/08* | (2006.01) |
| *B60R 19/24* | (2006.01) |
| *B60R 19/12* | (2006.01) |

(52) U.S. Cl.
CPC ............ *B62D 21/152* (2013.01); *B60R 19/12* (2013.01); *B60R 19/24* (2013.01); *B62D 25/082* (2013.01); *B62D 25/085* (2013.01); *B60R 2019/247* (2013.01); *B62D 21/155* (2013.01)

(58) Field of Classification Search
CPC ...... B60R 19/24; B62D 21/15; B62D 21/152; B62D 21/155; B62D 25/08; B62D 25/082; B62D 25/085

USPC .................. 296/187.09, 193.09, 203.02
See application file for complete search history.

(56) References Cited

U.S. PATENT DOCUMENTS

| | | | |
|---|---|---|---|
| 4,440,435 A * | 4/1984 | Norlin ................ | B62D 25/082 280/784 |
| 8,152,224 B2 | 4/2012 | Faruque et al. | |
| 8,789,874 B2 | 7/2014 | Okamura et al. | |
| 8,879,877 B2 * | 11/2014 | Keller ................. | G02B 6/4486 385/103 |
| 8,967,701 B2 | 3/2015 | Barbat et al. | |
| 9,233,662 B2 | 1/2016 | Kito et al. | |
| 9,428,129 B2 | 8/2016 | Crona et al. | |
| 9,493,189 B2 | 11/2016 | Nusier et al. | |

(Continued)

FOREIGN PATENT DOCUMENTS

| | | |
|---|---|---|
| CN | 106240641 A | 12/2016 |
| DE | 4417380 A1 | 11/1995 |

(Continued)

OTHER PUBLICATIONS

Search Report from the United Kingdom Intellectual Property Office dated Nov. 28, 2018 regarding Application No. GB1810083.4 (7 pages).

*Primary Examiner* — Jason S Daniels
(74) *Attorney, Agent, or Firm* — Frank A. MacKenzie; Bejin Bieneman PLC

(57) ABSTRACT

A vehicle includes a body having a first rail and an upper rail spaced from the first rail. The upper rail has a base portion and a top prong and a bottom prong each extending from the base portion. The vehicle includes a bumper connected to the first rail and to the top prong, and a subframe connected to the bottom prong.

19 Claims, 8 Drawing Sheets

(56) References Cited

U.S. PATENT DOCUMENTS

| | | | |
|---|---|---|---|
| 2003/0025358 A1* | 2/2003 | Taguchi | B62D 21/152 |
| | | | 296/203.02 |
| 2007/0252413 A1* | 11/2007 | Fioravanti | B60N 2/012 |
| | | | 296/203.01 |
| 2008/0054665 A1* | 3/2008 | Baccouche | B62D 21/152 |
| | | | 296/3 |
| 2011/0148151 A1 | 6/2011 | Ryota et al. | |
| 2013/0207417 A1* | 8/2013 | Kihara | B60R 19/34 |
| | | | 296/187.09 |
| 2018/0154943 A1* | 6/2018 | Huang | B62D 21/15 |

FOREIGN PATENT DOCUMENTS

| | | |
|---|---|---|
| EP | 1000840 A2 | 10/1999 |
| JP | 2007185983 A | 7/2007 |
| JP | 2009166613 A | 7/2009 |
| JP | 6065994 B2 | 1/2017 |

\* cited by examiner

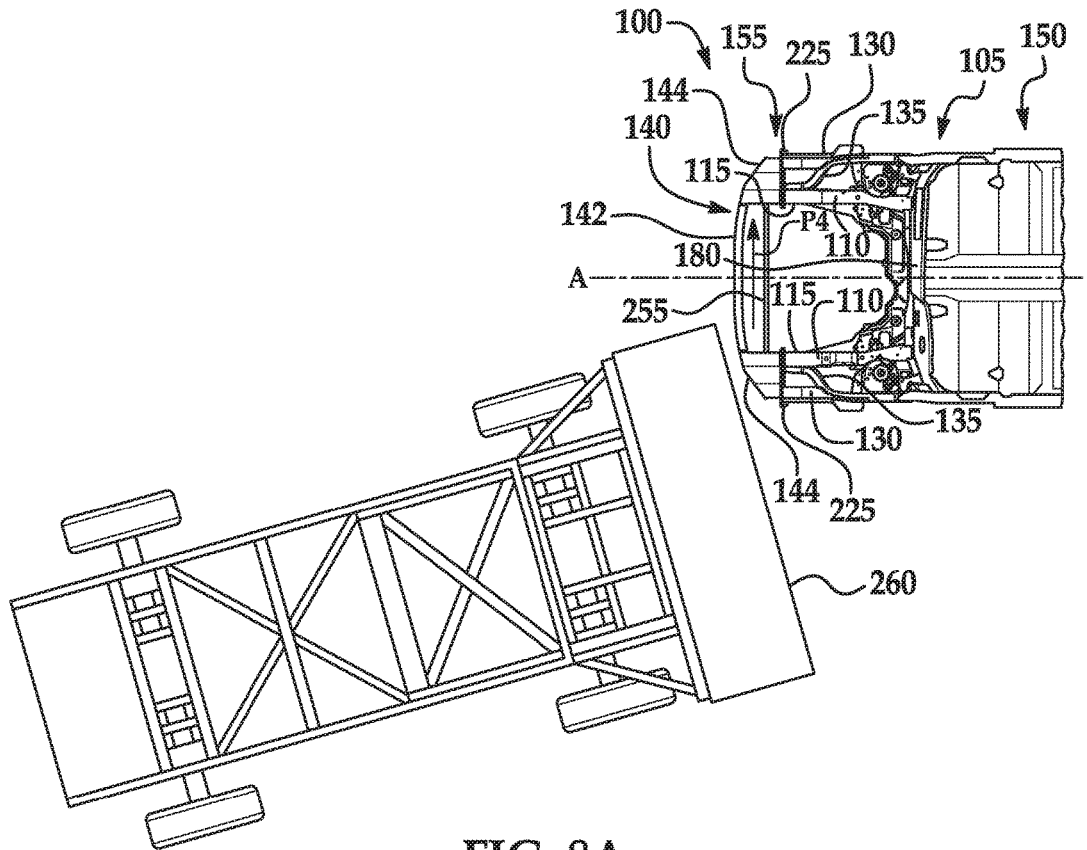
FIG. 8A
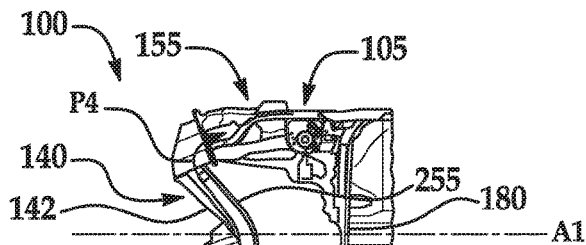
FIG. 8B
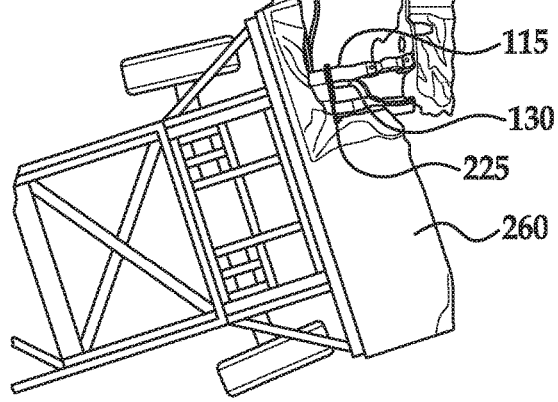

VEHICLE FRAME STRUCTURE

BACKGROUND

A vehicle body supports various components such as an engine, drivetrain, and/or suspension of the vehicle. During impacts of a front of the vehicle, such as those defined by Federal Motor Vehicle Safety Standards (FMVSS) and Insurance Institute for Highway Safety (IIHS) standards including frontal impacts, angular frontal impact, small offset rigid barrier (SORB) impact, etc., front structural components of the vehicle may deform to absorb energy. However, rigid components such as an engine, drivetrain, etc. may not deform to absorb energy. Thus, these rigid components may transmit a pulse through the rest of the vehicle during a frontal impact.

BRIEF DESCRIPTION OF THE DRAWINGS

FIG. 8A is a top view of the vehicle body prior to an oblique impact.

FIG. 8B is a top view of the vehicle body after the oblique impact.

DETAILED DESCRIPTION

Figure 1:
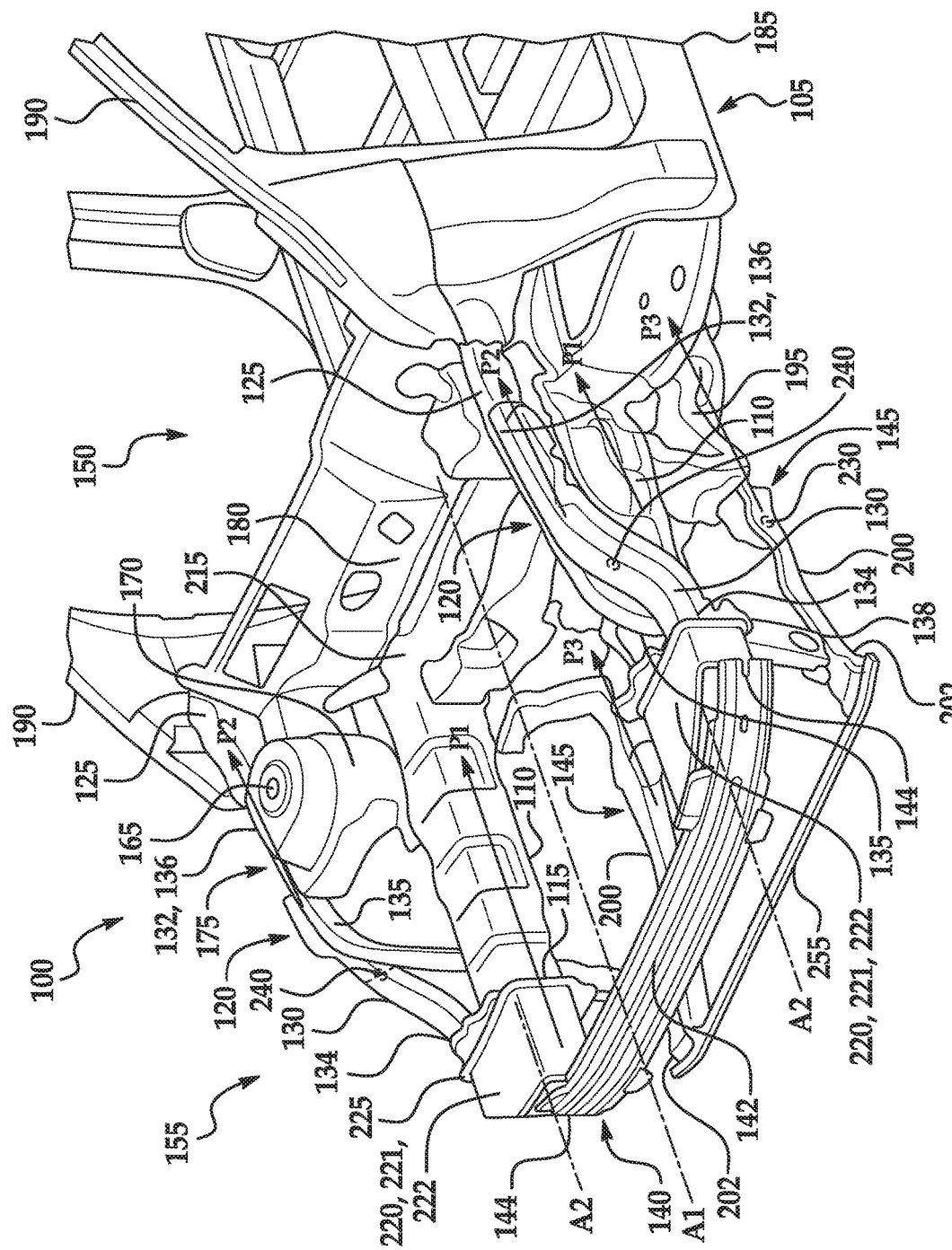
FIG. 1 is a perspective view of a portion of a vehicle body and a vehicle subframe connected to the body.

Disclosed herein is a vehicle that includes a body having a first rail and an upper rail spaced from the first rail. The upper rail has a base portion and a top prong and a bottom prong each extending from the base portion. The vehicle includes a bumper connected to the first rail and to the top prong, and a subframe connected to the bottom prong.

The body may include a hinge pillar and the first rail and the base portion of the upper rail may extend from the hinge pillar.

The first rail, the top prong, and the bottom prong each may have distal ends spaced from the hinge pillar. The bumper may be connected to the distal ends of the first rail and the top prong, and the subframe may be connected to the distal end of the bottom prong.

The subframe may extend in a vehicle fore-and-aft direction from the body to the bottom prong, and the subframe may include a bending point between the body and the bottom prong designed to bend downward in response to a vehicle frontal impact.

The top prong may have a bending point designed to bend upward in response to a front impact.

The vehicle may further include a crush can disposed between the bumper and a distal end of the first rail.

The vehicle may further include a crush can disposed between the bumper and a distal end of the top prong.

The vehicle may further include a first crush can between the first rail and the bumper, and a second crush can between the top prong and the bumper.

The vehicle may further include a plate connected to the first rail and to the top prong, the first crush can and the second crush can being connected to the plate.

The vehicle may further include a third crush can connected to the plate and to the bumper and disposed between the first crush can and the second crush can.

Further disclosed herein is a vehicle body including a bulkhead, a hinge pillar, a shock tower having an outboard side and an inboard side, and a first rail extending in a vehicle-forward direction from the bulkhead on the inboard side of the shock tower. The vehicle body further includes an upper rail on the outboard side of the shock tower, the upper rail having a base portion and a top prong and a bottom prong each extending from the base portion in the vehicle-forward direction.

The base portion of the upper rail may extend from the hinge pillar.

The top prong may have a bending point designed to bend upward in response to a front impact.

The vehicle body may further include a plate connected to the first rail and the top prong, and a first crush can and a second crush can being connected to the plate.

The top prong may have an end spaced away from the bulkhead, and the end of the top prong and a distal end of the first rail may be spaced a substantially equal distance from the bulkhead.

The vehicle body may further include a crush can disposed on a distal end of the first rail.

The vehicle body may further include a crush can disposed on a distal end of the top prong.

The vehicle body may further include a first crush can on the first rail, and a second crush can on the top prong.

With reference to the Figures, wherein like numerals indicate like parts throughout the several views, a vehicle 100 includes a body 105 having a first rail 110 and an upper rail 120 spaced from the first rail 110. The upper rail 120 has a base portion 125 and a top prong 130 and a bottom prong 135 each extending from the base portion 125. The vehicle 100 includes a bumper 140 connected to the first rail 110 and the top prong 130, and a subframe 145 connected to the bottom prong 135.

Figure 2:
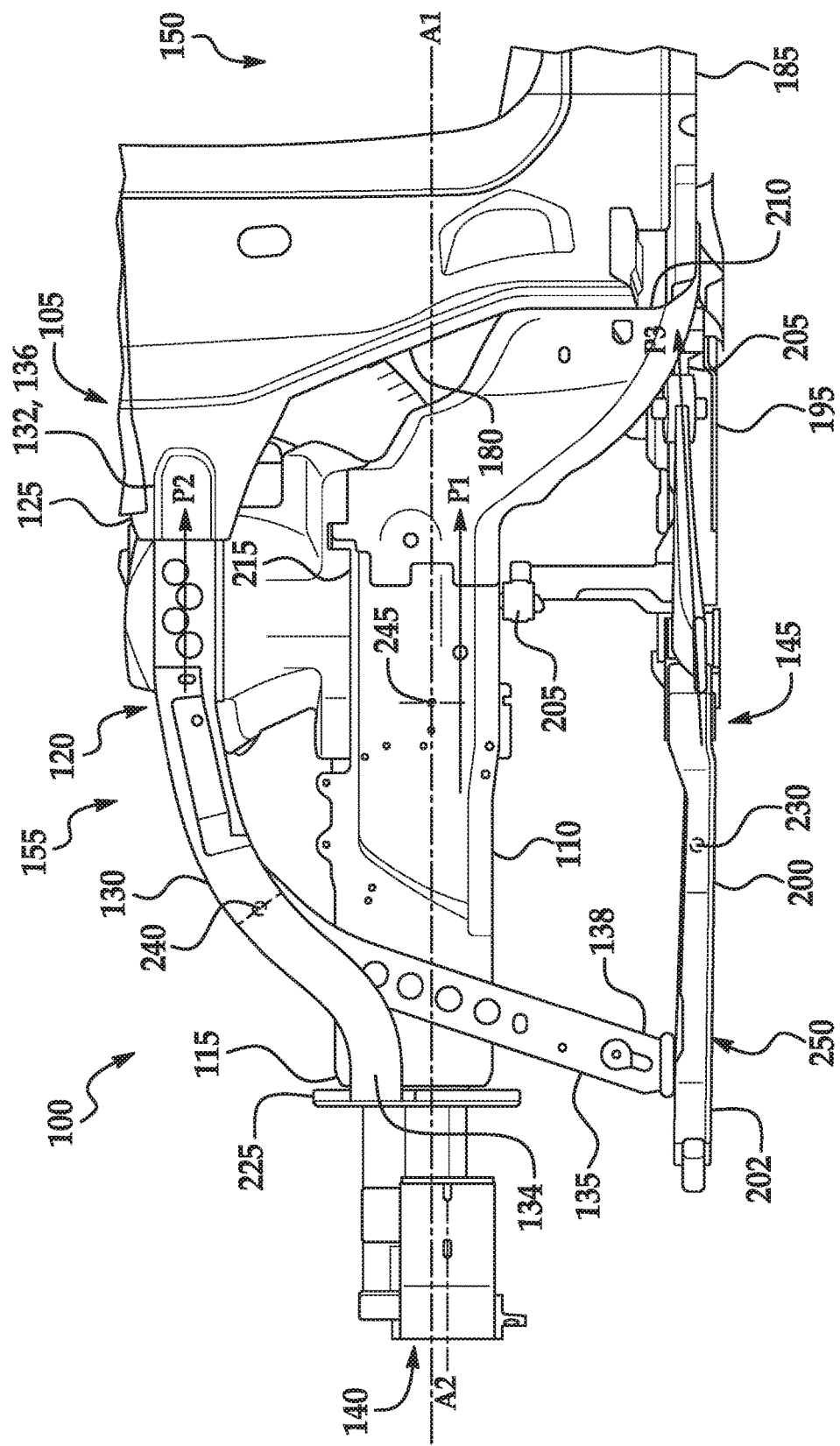
FIG. 2 is a side view of FIG. 1.
Figure 3:
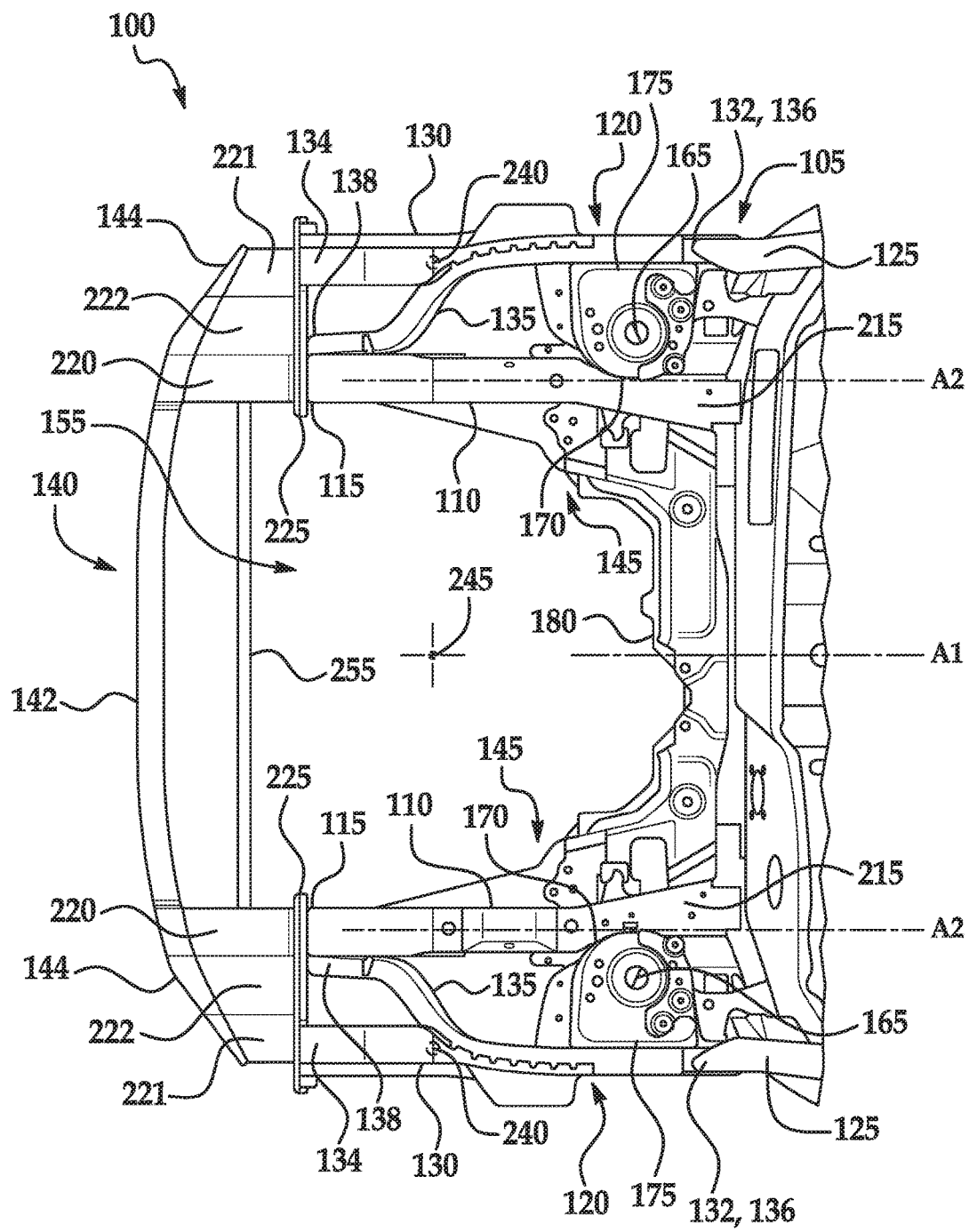
FIG. 3 is a top view of FIG. 1.

FIGS. 1-3 illustrate a portion of the body 105 of the vehicle 100 and the subframe 145 connected to the body 105. The vehicle 100 may be, for example, a car, a truck, a van, a bus, etc. Vehicles, such as vehicle 100, are subject to various standards including frontal impact standards as defined by Federal Motor Vehicle Safety Standards (FMVSS) and Insurance Institute for Highway Safety (IIHS) standards. The frontal impact may include, for example, head-on impact, angular frontal impact, small offset rigid barrier (SORB) impact, etc.

The vehicle 100 may have a unibody construction, i.e., a unitary-body construction. In the unibody construction, the body 105 serves as a vehicle frame, and the body 105 (including the rockers, pillars, roof rails, etc.) is unitary, i.e., a continuous one-piece unit.

The body 105 may be formed of any suitable material, for example, steel, aluminum, etc. The body 105 may be sheet metal, e.g., steel. The sheet metal may be 0.7-1.5 mm thick. Alternatively, the body 105 can be of any suitable material of any suitable thickness.

With reference to FIGS. 1-3 and 4A-4B, the body 105 may include a passenger compartment 150 and an engine compartment 155. The passenger compartment 150 may include seats, etc. The engine compartment 155 may include an engine 160, shock towers 165, etc. The shock towers 165 may have an inboard side 170 facing the engine 160 and an outboard side 175 facing away from the engine 160. The shock towers 165 may include struts, shock absorbers, etc. that are part of a vehicle suspension system.

The body 105 may include a bulkhead 180. The bulkhead 180, in the present context, refers to a portion of the body 105 that separates the passenger compartment 150 and the engine compartment 155. The bulkhead 180 may be formed of metal, or any other suitable material.

The passenger compartment 150 may include a floor 185, a roof (not shown), and multiple pillars 190 interconnecting the floor 185 and the roof. The pillars 190 located adjacent the bulkhead 180 may be referred to as hinge pillars 190 or A-pillars. Typically, hinges of vehicle front doors are mounted to the hinge pillars 190.

The subframe 145 supports various components such as the engine 160, a drivetrain, etc. of the vehicle 100. The subframe 145 extends in a fore and aft direction (e.g., parallel to a vehicle longitudinal axis A1) from the body 105 toward the bumper 140 of the vehicle 100. The subframe 145 can be formed, for example, of steel, aluminum, or any suitable material. The subframe 145 includes a base 195 and beam(s) 200 extending from the base 195. Specifically, the subframe 145 includes a pair of beams 200 spaced from one another and extending from the base 195 of the subframe 145. The subframe 145 may absorb impact energy and may deform due to an impact, as discussed further below with reference to FIGS. 4A-4B.

The subframe 145 may be connected to the body 105 via connectors 205, as shown in FIG. 2. For example, the subframe 145 may be connected to a lower end 210 of the bulkhead 180. Additionally or alternatively, the subframe 145 may be connected to the first rail 110, e.g., the first end 215 of the first rail 110. The connectors 205 are spaced from each other and connect the subframe 145 and the body 105. Both of the connectors 205 may be identical.

With continued reference to FIGS. 1-3, the vehicle 100 may include the body 105 having the first rail 110 with a distal end 115, and the upper rail 120 spaced from the first rail 110. The upper rail 120 may have the base portion 125 and the top prong 130 and the bottom prong 135 each extending from the base portion 125. The vehicle 100 may include the bumper 140 connected to the first rail 110 and the top prong 130. The vehicle 100 may include the subframe 145 connected to the bottom prong 135.

The first rail 110 may have an elongated shape, e.g., a beam, with a longitudinal axis A2 parallel to the longitudinal axis A1 of the vehicle 100. The first rail 110 may have the first end 215 adjacent, e.g., within 30 cm, the passenger compartment 150 and the distal end 115 spaced away from the passenger compartment 150. The first end 215 of the first rail 110 may be connected to the bulkhead 180 via welding or any other suitable mechanical connection. The first rail 110 and/or the upper rail 120 may absorb impact energy and may deform due to an impact, as discussed below.

The base portion 125 of the upper rail 120 may be mechanically connected to the bulkhead 180 on the inboard side 170 of the shock tower 165. The base portion 125 and the bulkhead 180 may be connected via welding or any other suitable mechanical connection. The top and the bottom prongs 130, 135 of the upper rail 120 each have a first end 132, 136 and a distal end 134, 138. The first ends 132, 136 of the top prong 130 and the bottom prong 135 may be connected to the base portion 125. The distal ends 134, 138 of the top prong 130 and the bottom prong 135 extend away from the base portion 125. The prongs 130, 135 of the upper rail 120 may have a curved shape. The prongs 130, 135 of the upper rail 120 may be formed of metal beams.

The bumper 140 may include a structure attached to or integrated with a front and/or rear ends of a vehicle 100, to, e.g., absorb impact in a collision. The bumper 140 may be mounted parallel to a ground surface and perpendicular to a vehicle longitudinal axis A1. The bumper 140 may include a beam 142 having a first and a second end 144. The bumper 140 may be deformed due to an impact. The bumper 140 may be formed of metal, composite material, or any other suitable material.

In one example, the distal ends 115 of the first rail 110, the top prong 130, and the bottom prong 135 may be spaced from the hinge pillar 190. The bumper 140 may be connected to the distal ends 115, 134 of the first rail 110 and the top prong 130. A distal end 202 of the subframe beam 200 may be connected to the distal end 138 of the bottom prong 135.

The first end 215 of the first rail 110 and the base portion 125 of the upper rail 120 may extend from the hinge pillar 190. In one example, the first end 215 of the first rail 110 may extend from the inboard side 170 of the shock tower 165. The vehicle 100 may include two first rails 110; a right first rail 110 connected to the inboard side 170 of a right shock tower 165 and a left first rail 110 connected to an inboard side 170 of a left shock tower 165, as shown in FIGS. 1-3. Additionally or alternatively, the first end 215 of the first rail 110 may be connected to an inboard side 170 of the shock tower 165.

Crush can(s) 220, 221, 222 may be included in a vehicle 100, e.g., as a part of the body 105, to absorb impact energy. A crush can 220, 221, 222 may include a hollow can (or box) formed of metal sheets or any other suitable material. The crush cans 220, 221, 222 may have a cylindrical, solid rectangular, or any other suitable shape. In one example, upon a frontal impact, the crush cans 220, 221, 222 may deform (compress) along an axis substantially parallel to a vehicle longitudinal axis A1. The crush cans 220, 221, 222 may absorb energy to deform. Thus, advantageously, the crush may then reduce an amount of an energy impulse that otherwise would be applied to the passenger compartment 150.

The vehicle 100 may include a plate 225 connected, e.g. welded, to the distal ends 115 of the first rail 110 and the top prong 130. In one example, the vehicle 100 may include one or more crush cans 220, 221, 222 that are connected to the plate 225. The crush cans 220, 221, 222 may be distinct components that can be welded, screwed, or otherwise connected to the body 105. Additionally or alternatively, the crush cans 220, 221, 222 may be included as a part of the body 105, e.g., manufactured as a part of the body 105. In one example, a first and a second plate 225 may be connected to the distal ends 115 of the right and left first rails 110.

A first crush can 220 may be disposed between the bumper 140 and the distal end 115 of the first rail 110. The first crush can 220 may be fixed to both the plate 225 and the bumper 140. In one example, the first crush can 220 may be welded to both the plate 225 and the bumper 140. In another example, the first crush can 220 is welded to the plate 225 and screwed to the bumper 140. Thus, during a frontal impact the first crush can 220 may absorb at least a portion of impact energy that is transferred from the bumper 140 to the first rail 110. In other words, a portion of impact energy may travel on a first energy path P1 from the bumper 140 via the first crush can 220, plate 225, and first rail 110 to the bulkhead 180. A portion of the impact energy travelling through the first path P1 may be absorbed by the first crush can 220.

Additionally or alternatively, a second crush can 221 may be disposed between the bumper 140 and the distal end of the top prong 130. Specifically, the second crush can 221 may be fixed to both the plate 225 and the bumper 140. During a frontal impact the second crush can 221 may absorb at least a portion of impact energy that is transferred from the bumper 140 to the upper beam. In other words, a portion of the impact energy may travel on a second path P2 from the bumper 140 via the second crush can 221, plate 225, and the upper rail 120 to the bulkhead 180. A portion of the impact energy travelling through the second path P2 may be absorbed by the second crush can 221. Additionally or alternatively, more crush cans, e.g., a third crush can 222 may be disposed between the bumper beam 142 and the plate 225. The third crush can 222 may be fixed to both the plate 225 and the bumper 140. In one example, the third crush can 222 may be disposed between the first and second crush cans 220, 221.

The beam 200 of the subframe 145 may extend between the body 105 and the distal end 138 of the bottom prong 135. For example, the top prong 130 may be curved down (i.e., bent down toward the ground surface) such that the distal end of the top prong 130 and the distal end of subframe 145 can be connected. Thus, during a frontal impact a portion of the impact energy may travel on a third path P3 via the subframe 145 to the bulkhead 180. Additionally, a portion of the impact energy may travel through the top prong 130 to the bulkhead 180.

Figure 5:
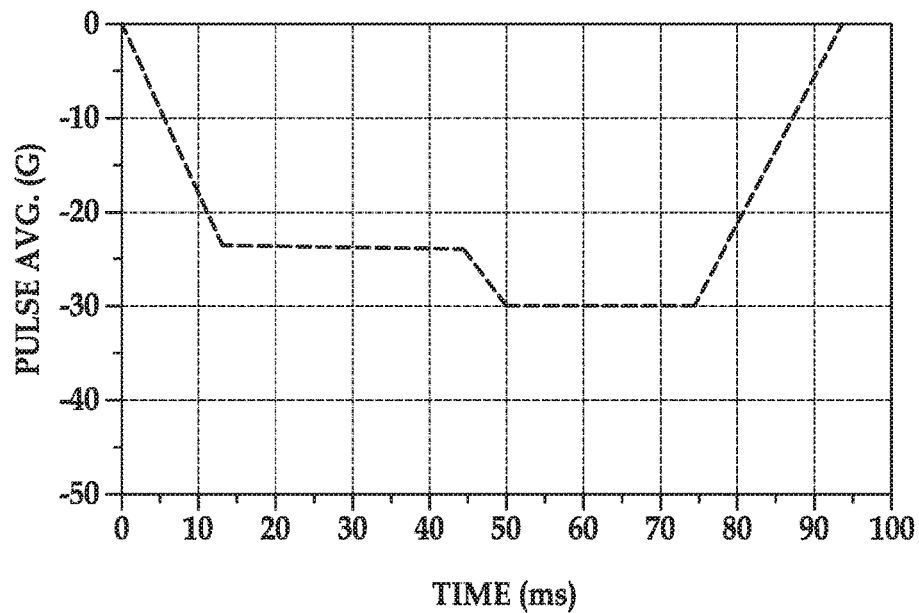
FIG. 5 shows an exemplary graph of an impact pulse applied to vehicle during a front impact.

FIG. 5 is an example graph that illustrates an example acceleration of a vehicle passenger caused by a frontal impact. As discussed above, a frontal impact, e.g., caused by a crash to another vehicle, may cause an impact energy that is transferred to vehicle passenger(s) in the passenger compartment 150. The impact energy causes an acceleration of a vehicle passenger.

In the present disclosure, a frontal impact may include an impact with an impact force that is substantially in a direction of the longitudinal axis A1 of the vehicle 100 and/or an oblique impact with an impact force direction transverse to the longitudinal axis A1 of the vehicle 100. "The impact force transverse to the longitudinal axis A1" means the impact force direction crosses the longitudinal axis A1 of the vehicle 100.

Figure 4A:
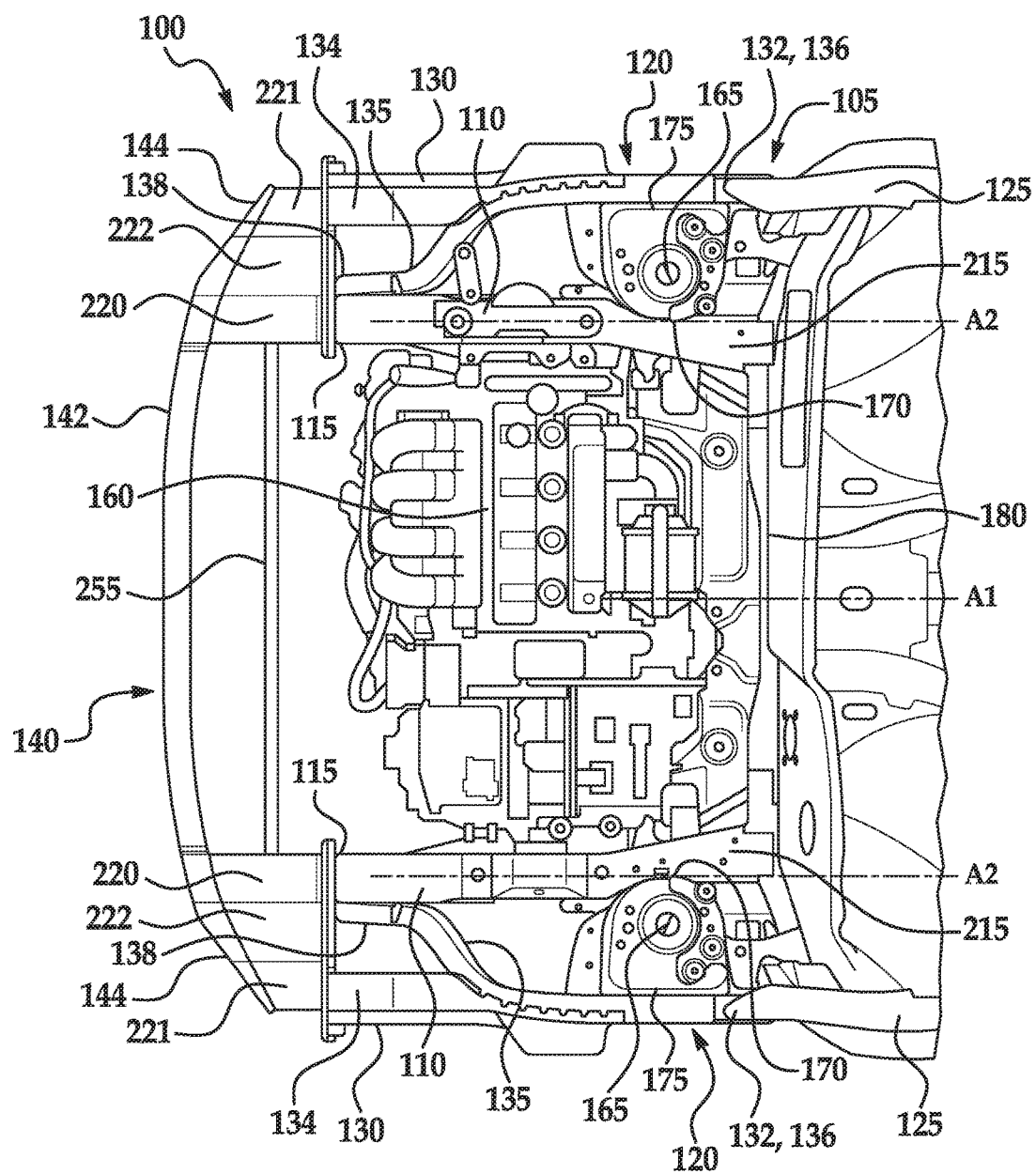
FIG. 4A is a top view of the vehicle body, the subframe, and an engine prior to a front impact.
Figure 4B:
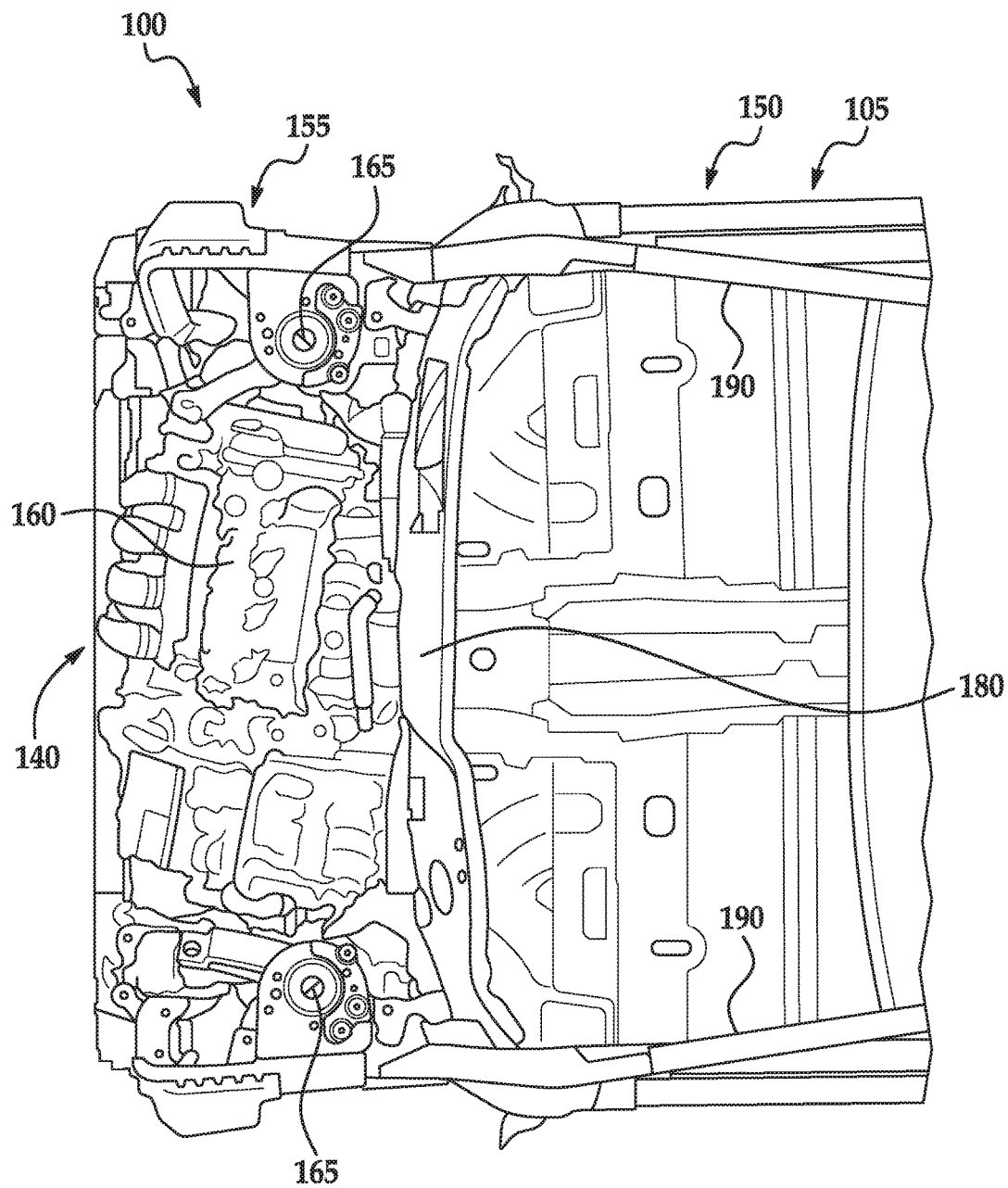
FIG. 4B is a top view of the vehicle body, the subframe, and the engine after the front impact.

FIGS. 4A-4B show a vehicle 100 prior and after a frontal impact, respectively. Upon a frontal impact, the vehicle components such as subframe 145, bumper 140, first rail 110, upper rail 120, etc. may deform and absorb energy as being deformed. Based on cavities available between the components, e.g., between the engine 160 and the bulkhead 180, etc., a deformation of vehicle components may reach a compressed state. The compressed state, in the present context, refers to a state of vehicle 100 at which the engine compartment 155 may not be deformed further without deforming the passenger compartment 150. For example, the engine compartment 155 may not have any cavities available to compress the components of the engine compartment 155 further toward one another, therefore the impact force starts to cause a deformation of, e.g., the bulkhead 180.

FIG. 5 includes an example graph that illustrates an amount of impact force applied to a vehicle occupant upon a frontal impact. A time 0 (zero) in FIG. 5 illustrates a time at which a reference frontal impact pulse is applied to the vehicle 100. A reference impact pulse, in the present context, refers to a step impact pulse, e.g., a frontal crash in a crash lab environment. Thus, based on the reference impact pulse, performances of various vehicles in regard to force applied to a vehicle occupant can be compared to one another.

As shown in FIG. 5, an impact may at first cause a first force level, e.g., approx. −25 G, and then an increased level of force or a second force level, e.g., −30 G. In one example, the first force level is applied to a vehicle occupant while components of the engine compartment 155 are being deformed, e.g., prior to reaching the above described compressed state. Therefore, during the first force level, vehicle components such as the crush cans 220, 221, 222 absorb a portion of impact energy. After reaching the compressed state, e.g., a complete deformation of the crush cans 220, 221, 222, etc. in the engine compartment 155, a higher amount of force, e.g., the second force level, may be applied to the vehicle occupant. In other words, after reaching the compressed state, in lack of absorption of the impact energy by vehicle components in the engine compartment 155, more force may be applied to the passenger compartment 150. Therefore, more impact force may be applied to the vehicle occupant. A reduction of force applied to a vehicle occupant may be advantageous because that may reduce a likelihood of occupant's injury. As discussed below, with reference to FIGS. 7A-7B and 8A-8B, the first, second, and third energy paths P1, P2, P3 may be advantageous to reduce an amount of impact force applied to a vehicle occupant.

Figure 6:
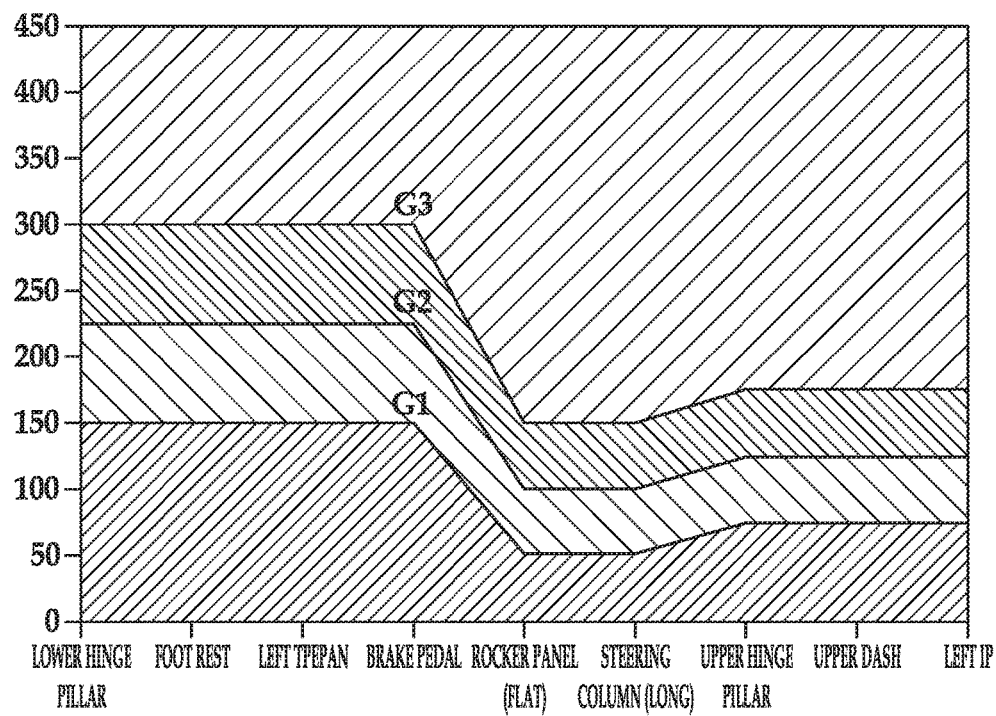
FIG. 6 shows an exemplary graph of intrusion threshold for various location of vehicle body.

FIG. 6 includes example graphs G1, G2, G3 depict multiple deformation thresholds for various locations of the vehicle 100, e.g., relative to a vehicle seat location. X axis of the graphs G1, G2, G3 indicates various locations (components) of the vehicle 100, e.g., foot rest, brake pedal, steering, etc. Y axis shows an amount of maximum movement threshold (in millimeter) applicable to the respective vehicle component, e.g., based on applying the reference impact pulse to the vehicle 100. Thus, each graph G1, G2, G3 may define a maximum movement (deformation) applicable to a respective component of the vehicle 100 upon applying the reference impact pulse.

Each of the graphs G1, G2, G3 depicts a movement (deformation) threshold for each of the respective vehicle components shown on the X axis. A vehicle 100 may be compliant (or designed to comply) with one of the graphs G1, G2, G3. In other words, a vehicle 100 may be designed in such a way that a deformation (movement) applied to each of the vehicle components in response to the reference impact pulse is less than the threshold of a respective graph. Thus, the reference impact pulse applied to a first vehicle 100 compliant to a graph such as the graph G1 with lower thresholds compared to a second vehicle 100 compliant with another graph such the graph G2 may cause less deformation (i.e., movement of vehicle components). Therefore, the vehicle body 105, bumper 140, subframe 145, etc. may be designed and manufactured to comply with a lower graph such as the graph G1, i.e., to reduce a maximum deformation applied to each of the respective vehicle components as shown in FIG. 5. Here below, various example ways of reducing a deformation applied to the passenger compartment 150 are described.

Figure 7A:
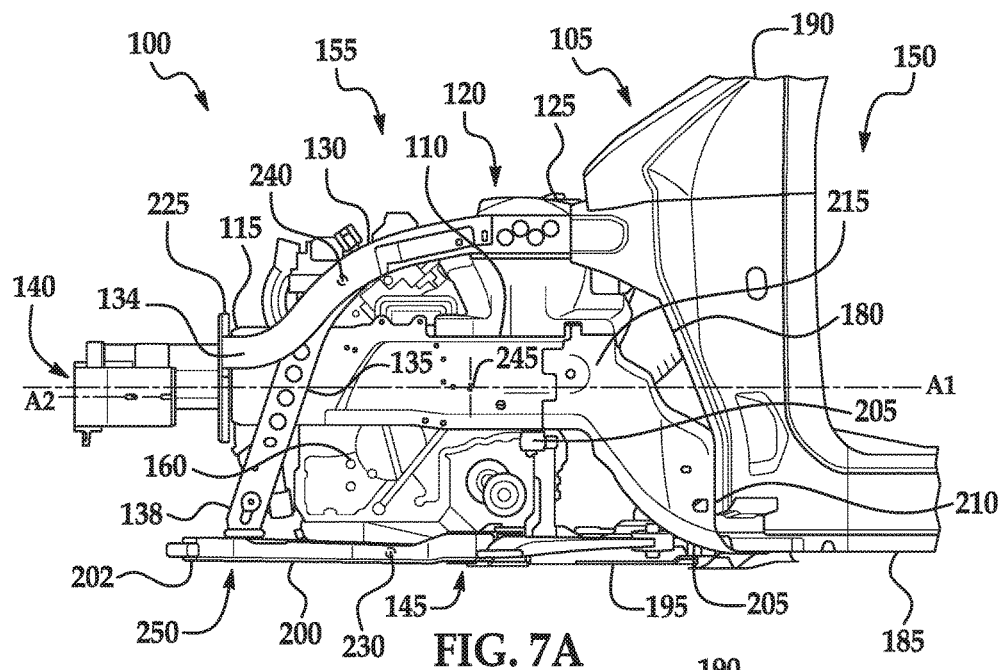
FIG. 7A is a side view of the vehicle body, engine, and subframe prior to a front impact.

FIG. 7A is a side view of the vehicle body 105, engine 160, and subframe 145 prior to a front impact, e.g., applying the reference impact pulse. FIG. 6B is a side view of the vehicle body 105, engine 160, and subframe 145 after applying the reference impact pulse. In one example, the beam 200 of the subframe 145 may include a bending point 230 between the body 105 (e.g., the bulkhead 180) and the distal end 138 of the bottom prong 135 that is designed to bend downward (i.e., toward the ground surface) as a result of a frontal impact. For example, the beam 200 of the subframe 145 may be manufactured in such a way that is weaker in the bending point 230 compared to a rest of the beam 200. Additionally or alternatively, the top prong 130 may have a bending point 240 designed to bend upward as a result of the front impact. The top prong 130 may be manufactured in such a way that is weaker in the bending point 240 compared to the rest of the top prong 130.

Figure 7B:
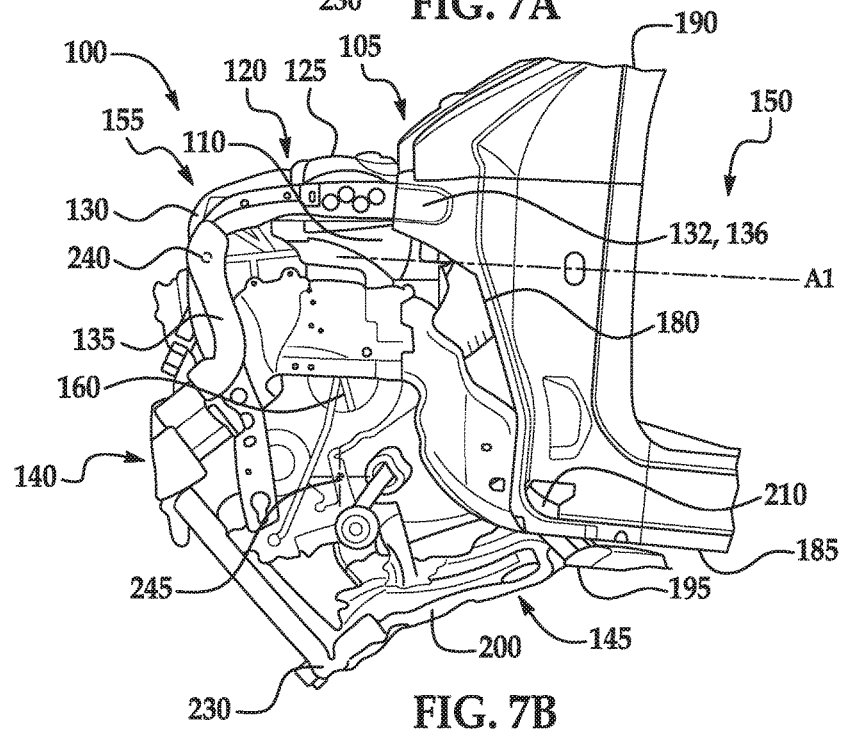
FIG. 7B is a side view of the vehicle body, engine, and subframe after the front impact.

With reference to FIGS. 7A-7B, the bending points 235, 240 included in the sub-frame beam 200 and/or the top prong 130 may result in an increased absorption of impact energy. As discussed above, the first, second, and third energy paths P1, P2, P3 transfer each a portion of impact energy to the bulkhead 180 while each absorbing a portion of the energy being transferred. Thus, the bending points 235, 240 in the subframe beam 200 and/or the top prong 130 may reduce an amount of impact force applied to various vehicle components. That may result in reduction of impact force that may be applied to a vehicle occupant.

As discussed above with reference to FIGS. 4A-4B and 5, after reaching the compressed state, an absorption of impact force via vehicle components in the engine compartment 155 may reduce and more impact force may be applied to a vehicle occupant. As discussed in an example below, a delay in reaching the compressed state (with respect to X axis of FIG. 5), may reduce the second force level. In other words, when for a longer period of time the impact energy can be absorbed by vehicle components in the engine compartment 155, then more impact energy may be absorbed and therefore an amount of second force level may reduce.

In one example shown in FIGS. 6A-6B, the bulkhead 180, the first rail 110, the upper rail 120, and the subframe 145 may define a space grid with a geometrical center point 245 positioned substantially on the longitudinal axis A1 of the vehicle 100, and the geometrical center point 245 being, upon an impact of the bumper 140, moveable to a crushed position substantially at a bottom 250 of the body 105. In one example, moving the geometrical center point 245 to the crushed position below the longitudinal axis A1 of the vehicle 100 may delay a start of deforming the passenger compartment 150, i.e., may delay reaching the compressed state. In other words, a distance $d_1$ from the geometrical center point 245 to a center of bulkhead 180 (intersection of the longitudinal axis A1 and the bulkhead 180) may be shorter than a disposition distance $d_2$ of the geometrical center point 245 moving to the crushed position at the compressed state. Thus, a time for deforming, until the compressed state is reached, may be longer. Therefore, the second force level (with respect to FIG. 5) may be reduced.

In one example shown in FIGS. 8A-8B, an oblique impact may be applied to the vehicle body 105. An oblique impact, in the context of present disclosure, includes an impact applied in a direction transverse to the vehicle longitudinal axis A1. An oblique impact may be caused by an object 260. In contrast to a frontal impact, during an oblique impact, the oblique impact energy may be primarily applied to a portion of the engine compartment 155, e.g., a left side thereof in the example shown in FIGS. 8A-8B. For example, the oblique impact energy may substantially deform the left subframe beam 200, the left first rail 110, and/or the left upper rail 120.

The subframe 145 may include a second beam 255 mechanically connecting the distal ends 202 of the subframe beams 200. Thus, during an oblique impact, the second beam 255 may transfer a portion of the impact energy to the right subframe beam 200. In other words, a portion of the oblique impact energy may travel on a fourth energy path P4 via the second beam 255 to the right subframe beam 200.

Thus, advantageously, a deformation of a left side of the engine compartment 155 may be reduced compared to when the subframe 145 lacks the second beam 255.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
   a body having a first rail and an upper rail spaced from the first rail;
   the upper rail having a base portion and a top prong and a bottom prong each extending from the base portion;
   a bumper connected to the first rail and to the top prong; and
   a subframe connected to the bottom prong;
   the top prong having a bending point designed to bend upward in response to a front impact.

2. The vehicle of claim 1, wherein the body includes a hinge pillar and the first rail and the base portion of the upper rail extend from the hinge pillar.

3. The vehicle of claim 2, wherein the first rail, the top prong, and the bottom prong each have distal ends spaced from the hinge pillar, and wherein the bumper is connected to the distal ends of the first rail and the top prong, and wherein the subframe is connected to the distal end of the bottom prong.

4. The vehicle of claim 1, wherein the subframe extends in a vehicle fore-and-aft direction from the body to the bottom prong, and wherein the subframe includes a bending point between the body and the bottom prong designed to bend downward in response to a vehicle frontal impact.

5. The vehicle of claim 1, further comprising a crush can disposed between the bumper and a distal end of the first rail.

6. The vehicle of claim 1, further comprising a crush can disposed between the bumper and a distal end of the top prong.

7. The vehicle of claim 1, further comprising a first crush can between the first rail and the bumper, and a second crush can between the top prong and the bumper.

8. The vehicle of claim 7, further comprising a plate connected to the first rail and to the top prong, the first crush can and the second crush can being connected to the plate.

9. The vehicle of claim 8, further comprising a third crush can connected to the plate and to the bumper and disposed between the first crush can and the second crush can.

10. A vehicle body, comprising:
    a bulkhead;
    a hinge pillar;
    a shock tower having an outboard side and an inboard side;
    a first rail extending in a vehicle-forward direction from the bulkhead on the inboard side of the shock tower;
    an upper rail on the outboard side of the shock tower, the upper rail having a base portion and a top prong and a bottom prong each extending from the base portion in the vehicle-forward direction;
    a plate connected to the first rail and the top prong; and
    a first crush can and a second crush can being connected to the plate;
    the top prong having a bending point designed to bend upward in response to a front impact.

11. The vehicle body of claim 10, wherein the base portion of the upper rail extends from the hinge pillar.

12. The vehicle body of claim 10, wherein the top prong has an end spaced away from the bulkhead, and the end of the top prong and a distal end of the first rail are spaced a substantially equal distance from the bulkhead.

13. The vehicle body of claim 10, further comprising a crush can disposed on a distal end of the first rail.

14. The vehicle body of claim 10, further comprising a crush can disposed on a distal end of the top prong.

15. The vehicle body of claim 10, further comprising a first crush can on the first rail, and a second crush can on the top prong.

16. A vehicle, comprising:
a body having a first rail and an upper rail spaced from the first rail;
the upper rail having a base portion and a top prong and a bottom prong each extending from the base portion;
a bumper connected to the first rail and to the top prong; and
a subframe connected to the bottom prong and connected to the body, the subframe extending from the bottom prong to the body.

17. The vehicle of claim 16, wherein the subframe extends in a vehicle fore-and-aft direction from the body to the bottom prong, and wherein the subframe includes a bending point between the body and the bottom prong designed to bend downward in response to a vehicle frontal impact.

18. The vehicle of claim 16, wherein the subframe extends from the bottom prong to the body below an engine compartment.

19. The vehicle of claim 16, wherein the body includes a hinge pillar and the first rail and the base portion of the upper rail extend from the hinge pillar;
the first rail, the top prong, and the bottom prong each have distal ends spaced from the hinge pillar;
the bumper is connected to the distal ends of the first rail and the top prong; and
the subframe is connected to the distal end of the bottom prong and to the hinge pillar.

* * * * *